(12) United States Patent
Kumar et al.

(10) Patent No.: US 10,649,690 B2
(45) Date of Patent: May 12, 2020

(54) FAST MEMORY INITIALIZATION

(71) Applicant: Intel Corporation, Santa Clara, CA (US)

(72) Inventors: Mohan J. Kumar, Aloha, OR (US); George Vergis, Portland, OR (US); Sarathy Jayakumar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 246 days.

(21) Appl. No.: 14/998,196

(22) Filed: Dec. 26, 2015

(65) Prior Publication Data

US 2017/0185486 A1    Jun. 29, 2017

(51) Int. Cl.
| | |
|---|---|
| G06F 11/00 | (2006.01) |
| G06F 3/06 | (2006.01) |
| G06F 13/16 | (2006.01) |
| G06F 21/14 | (2013.01) |
| G06F 21/53 | (2013.01) |
| G06F 13/28 | (2006.01) |

(52) U.S. Cl.
CPC ............ G06F 3/0659 (2013.01); G06F 13/16 (2013.01); G06F 21/14 (2013.01); G06F 21/53 (2013.01); G06F 13/28 (2013.01); G06F 2221/2143 (2013.01)

(58) Field of Classification Search
CPC ............. G06F 11/1417; G06F 11/3034; G06F 11/3065; G06F 11/3027; G06F 11/3006
See application file for complete search history.

(56) References Cited

U.S. PATENT DOCUMENTS

| | | | | |
|---|---|---|---|---|
| 4,236,207 A | * | 11/1980 | Rado | G06F 11/1008 711/106 |
| 4,300,193 A | * | 11/1981 | Bradley | G06F 13/282 710/22 |
| 4,669,082 A | * | 5/1987 | Tilghman | G11C 29/56 365/201 |
| 5,659,748 A | * | 8/1997 | Kennedy | G06F 9/4405 713/2 |
| 5,835,697 A | * | 11/1998 | Watabe | G06F 11/1658 714/11 |
| 2003/0223269 A1 | * | 12/2003 | Hidaka | G11C 11/16 365/171 |
| 2005/0273630 A1 | * | 12/2005 | Shu | G06F 9/3001 713/189 |
| 2008/0159059 A1 | * | 7/2008 | Moyer | G06F 11/1008 365/236 |

(Continued)

*Primary Examiner* — Katherine Lin
(74) *Attorney, Agent, or Firm* — Alliance IP, LLC

(57) ABSTRACT

In an example, there is disclosed a memory controller, including: a data buffer to drive a determinate value to a data bus to communicatively couple to a memory; and a register clock driver to: receive a memory initialization command from a processor; and incrementally step through a plurality of initialization addresses, sequentially driving each initialization address to an address bus to communicatively couple to the memory. There is also disclosed a computing device comprising the memory controller, and a method of initializing memory comprising incrementally stepping through a plurality of initialization addresses and sequentially writing a determinate value to each address.

24 Claims, 6 Drawing Sheets

(56) References Cited

U.S. PATENT DOCUMENTS

| | | | |
|---|---|---|---|
| 2010/0005281 A1* | 1/2010 | Buchmann | G06F 13/4243 |
| | | | 713/2 |
| 2011/0093662 A1* | 4/2011 | Walker | G06F 15/7821 |
| | | | 711/147 |
| 2014/0223262 A1* | 8/2014 | Takefman | H03M 13/05 |
| | | | 714/768 |
| 2016/0041924 A1* | 2/2016 | Fields, Jr. | G06F 12/1081 |
| | | | 714/6.23 |
| 2016/0328150 A1* | 11/2016 | Park | G06F 13/1668 |
| 2017/0163683 A1* | 6/2017 | van den Berghe | H04L 63/18 |

* cited by examiner

FAST MEMORY INITIALIZATION

FIELD OF THE SPECIFICATION

This disclosure relates in general to the field of networked computing, and more particularly, though not exclusively to, a system and method for fast memory initialization.

BACKGROUND

In certain computing architectures, such as "cloud computing" or other instances where architecture is provided as a service, security between different clients may be an important concern. For example, clients may pay for a certain number of cores and a certain volume of memory. Cloud computing means that the client need not have the same cores and the same memory every time. They can be dynamically allocated as needed. However, when memory is allocated from one client to another, it may need to be completely cleared to ensure that there is no data leakage from one client to the other. This can take the form of writing all 1's, all 0's, or a random or pseudorandom sequence to memory to ensure that any old values are no longer usable or recoverable.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
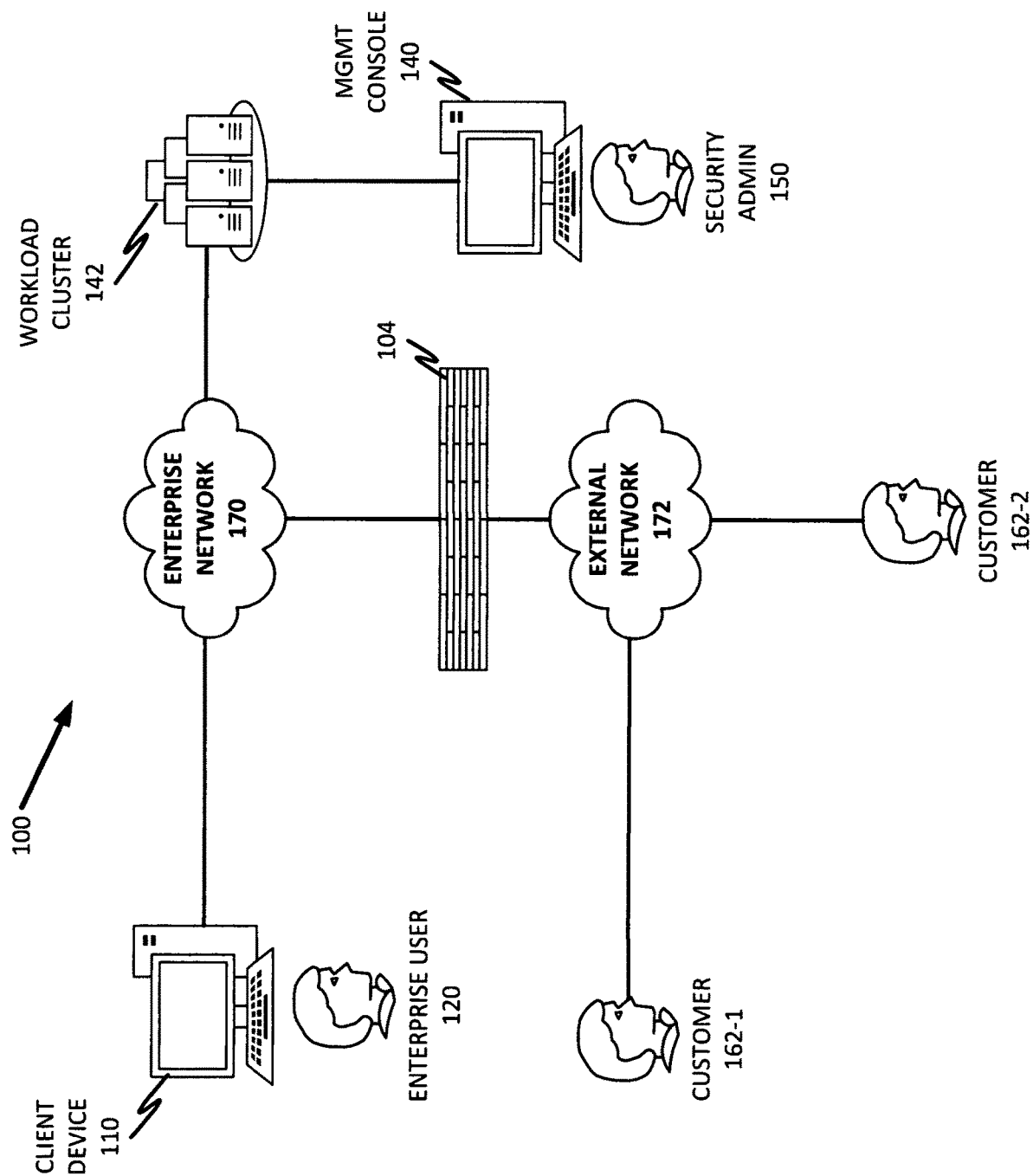
FIG. 1 is a block diagram of a networked enterprise according to one or more examples of the present specification.

In an example, there is disclosed a memory controller, including: a data buffer to drive a determinate value to a data bus to communicatively couple to a memory; and a register clock driver to: receive a memory initialization command from a processor; and incrementally step through a plurality of initialization addresses, sequentially driving each initialization address to an address bus to communicatively couple to the memory. There is also disclosed a computing device comprising the memory controller, and a method of initializing memory comprising incrementally stepping through a plurality of initialization addresses and sequentially writing a determinate value to each address.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In an enterprise or cloud data center, the aphorism "time is money" takes on a very literal meaning. When processing cores and memory are in a ready state, they can be leased out to clients for pay. When they are not ready, they cannot be leased out. Thus, it is of special concern for the enterprise data center to have machines that can be made ready as quickly as possible so that machines do not sit idle and unremunerative.

However, security is also a mandatory consideration. When memory that was previously allocated to one client (or used by the enterprise itself) is allocated to a second client, it is crucial that the memory contains no recoverable data. If data are recoverable from the memory, then the second client may be able to gain access to proprietary information of the service provider or first client. Fortunately, there are known, fairly straightforward techniques to securing memory before transferring it for use from one client to a second client.

One popular method is to write a fixed value to each memory location sequentially, such as a fixed "0." This can also be varied to be a fixed "1," a known pattern, or a random or pseudorandom pattern. The nature of volatile memory, such as dynamic random access memory (DRAM), is such that when a new value has been written to a memory location, it is difficult or impossible to recover the old value, and thus to reconstruct old data. This may be referred to as "initializing" the memory.

This technique has at least one drawback in certain embodiments, however. In an enterprise data center, memories can be very large, totaling many gigabytes or even terabytes. Even a fairly simple operation, such as sequentially writing a "0" to each location, can be time consuming in that context. In some cases of large memories, initializing the memory can take several minutes or in extreme cases even tens of minutes. During this time, the memory, and the cores being used to initialize it, though busy with their task, are completely idle from a remuneration perspective. They cannot be allocated to clients or end-users for compensation or productive enterprise purposes.

Initialization of a memory may also have some applicability in high-availability computing. Specifically, if a particular machine or service is guaranteed to have "five nines" reliability (e.g., 99.999% uptime), its total downtime can be no more than 5.26 minutes in a year. For "six nines" (99.9999% uptime), that time is slashed to 31.5 seconds per year. In certain existing architectures, the time to initialize memory may be approximately 1.5 seconds per gigabyte. For a machine with 256 gigabytes of memory, this implies approximately 2.8 minutes to initialize memory. Thus, if a machine needs to be rebooted and initialized once in a year, the time for initializing the memory could be the difference between "five nines" and "six nines."

Existing initialization methods may rely on an integrated memory controller in the processor. Recent trends such as "bare metal" clouds are bringing back the relevance of non-virtualized bare metal servers, such as in the "infrastructure as a service" (IaaS) context. As illustrated above, this may be spurred by the economics and compute density afforded by modern server platforms. The examples illustrated above require fast server boot times, since the boot time is unremunerated downtime for that server. But server boot times have actually increased in recent years, in part because memories have gotten larger. If memory is not initialized at boot with a corresponding error-correcting code (ECC), a processor "read for ownership" (RFO) may result in a "machine check" event.

The present specification recognizes the critical importance of fast initialization of memory, particularly in certain enterprise computing contexts. To this end, there is described herein a system and method for fast initialization of memory. In one example, there is no need for a processor memory controller to drive initialization of the memory. Rather, initialization may be offloaded to a fast hardware, software, and/or firmware routine on the direct Rambus DRAM (DRDRAM or RDRAM for short) module is configured to initialize the memory itself. Specifically, a registering clock driver (RCD) may be configured to provide each address sequentially, while a data buffer (DB) may be configured to provide the initialization pattern, which may be a 0, 1, fixed pattern, random pattern, pseudorandom pattern, or any combination of the foregoing.

In an example method, at boot time, a host firmware issues a special command to the RCD of each DRAM dual in-line memory module (DIMM), instructing them to initialize themselves. The RCD then latches 0 to each DB in DRAM module. The RCD internally steps through each addressable memory of each DRAM module, and allows the buffered 0 to be written. Advantageously, each separate DIMM can be initialized in parallel, as the same address and data can be bused together and written out to each DIMM at the same time. Once the entire DRAM module has been initialized, the RCD indicates success by writing out a notification to the processor, such as writing to a special register or providing a hardware signal. The host firmware then confirms the completion of the DRAM initialization and the processor proceeds with booting.

A system and method for fast memory initialization will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a networked enterprise 100 according to one or more examples of the present specification. In this example, networked enterprise 100 may be configured to provide services or data to one or more customers 162, who may access information or services via external network 172. This may require networked enterprise 100 to at least partly expose certain services and networks to the outside world, thus creating a logical security aperture.

Within networked enterprise 100, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. In some embodiments, workload cluster 142 may be, or may comprise, a "bare metal cloud." A bare metal cloud may be a substitute or a complement for a traditional virtual cloud, with a dedicated server that eliminates the overhead of virtualization. Specifically, bare metal cloud machines do not run a hypervisor and are not virtualized, but can still be flexibly provided and allocated on an on-demand basis according to the expectations of cloud computing. However, when a bare-metal cloud machine is reallocated from one client to another, its memory may need to be initialized to ensure that no data are compromised.

In other embodiments, workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs. In yet other examples, workload cluster 142 may provide a heterogeneous data center, in which certain machines are provisioned with hypervisors, and others are provisioned as "bare metal" servers.

Some functionality of endpoint devices 110 may also be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 110 could be a "thin client" such as a Google Chromebook, running only a stripped-down operating system, and still provide user 120 useful, access to enterprise resources.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In other case, management console 140 may be provided as a web interface, on a desktop-class machine, or via a VM provisioned within workload cluster 142.

In an operational example, customer 1 162-1 and customer 2 162-2 may both contract with networked enterprise 100 for bare metal cloud services within workload cluster 142. One or more servers may also be provisioned to provide services to enterprise user 120 operating client device 110. As discussed above, enterprise users 120, customer 162-1, and customer 162-2 may all have enterprise data resident on physical servers provisioned for their use. However, when that server is deallocated, it may be necessary to ensure that enterprise user 120, customer 162-1, and customer 162-2 cannot access one another's "leftover" data. Thus, security administrator 150 may need to use management console 140 to configure individual servers in workload cluster 142 to initialize their memory any time the server is re-allocated to a new client or user. To minimize uncompensated downtime, at least some servers in workload cluster 142 may be configured with fast memory initialization, as described in this specification.

Figure 2:
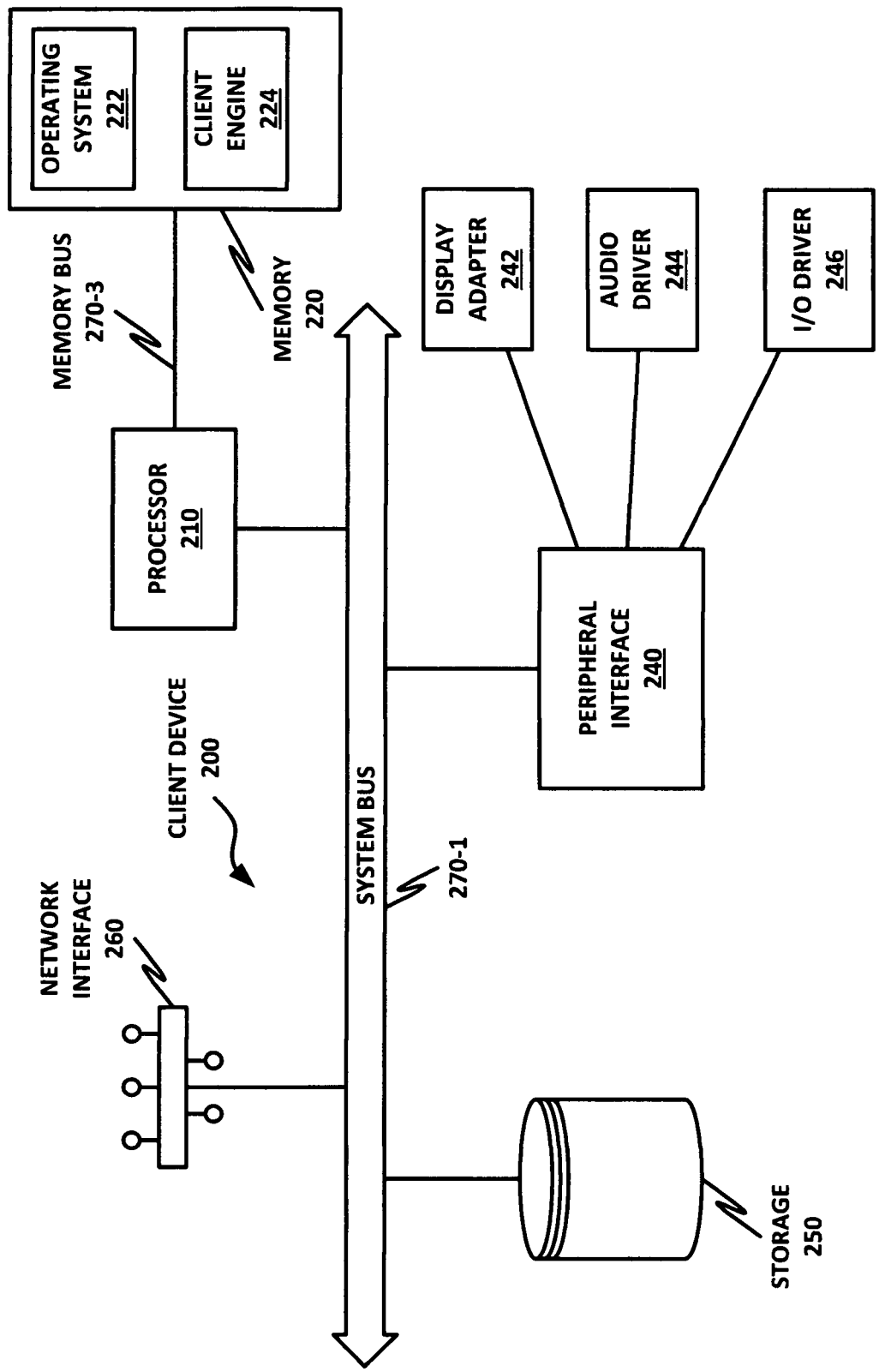
FIG. 2 is a block diagram of a computing device according to one or more examples of the present specification.

FIG. 2 is a block diagram of client device 200 according to one or more examples of the present specification. Client device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device or computing apparatus for processing and communicating data. Any computing device may be designated as a host on the network. Each computing device may refer to itself as a "local host," while any computing device external to it may be designated as a "remote host."

In certain embodiments, client devices 110 may all be examples of client devices 200.

Client device 200 includes a processor 210 connected to a memory 220, having stored therein executable instructions for providing an operating system 222 and at least software portions of a client engine 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of client engine 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Client engine 224, in one example, is operable to carry out computer-implemented methods as described in this specification. Client engine 224 may include one or more tangible non-transitory computer-readable mediums having stored thereon executable instructions operable to instruct a processor to provide a client engine 224. As used throughout this specification, an "engine" includes any combination of one or more logic elements, of similar or dissimilar species, operable for and configured to perform one or more methods provided by the engine. Thus, client engine 224 may comprise one or more logic elements configured to provide methods as disclosed in this specification. In some cases, client engine 224 may include a special integrated circuit designed to carry out a method or a part thereof, and may also include software instructions operable to instruct a processor to perform the method. In some cases, client engine 224 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that client engine 224 may also include other hardware and software, including configuration files, registry entries, and interactive or user-mode software by way of non-limiting example.

In one example, client engine 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of client engine 224 to provide the desired method.

Client engine 224 may enable a user, such as enterprise user 120, customer 162, or security administrator 150 to access an individual server on workload cluster 142, or to access certain functions and interfaces on any such server. This may include providing both the communication protocols, and the interface or interfaces necessary for performing client functions on workload cluster 142. In appropriate circumstances, client engine 224 may be or comprise, as appropriate, a GUI, CLI, FTP client, HTTP client, HTTPS client, email client, secure shell client, or any other suitable mechanism.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or, graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Figure 3:
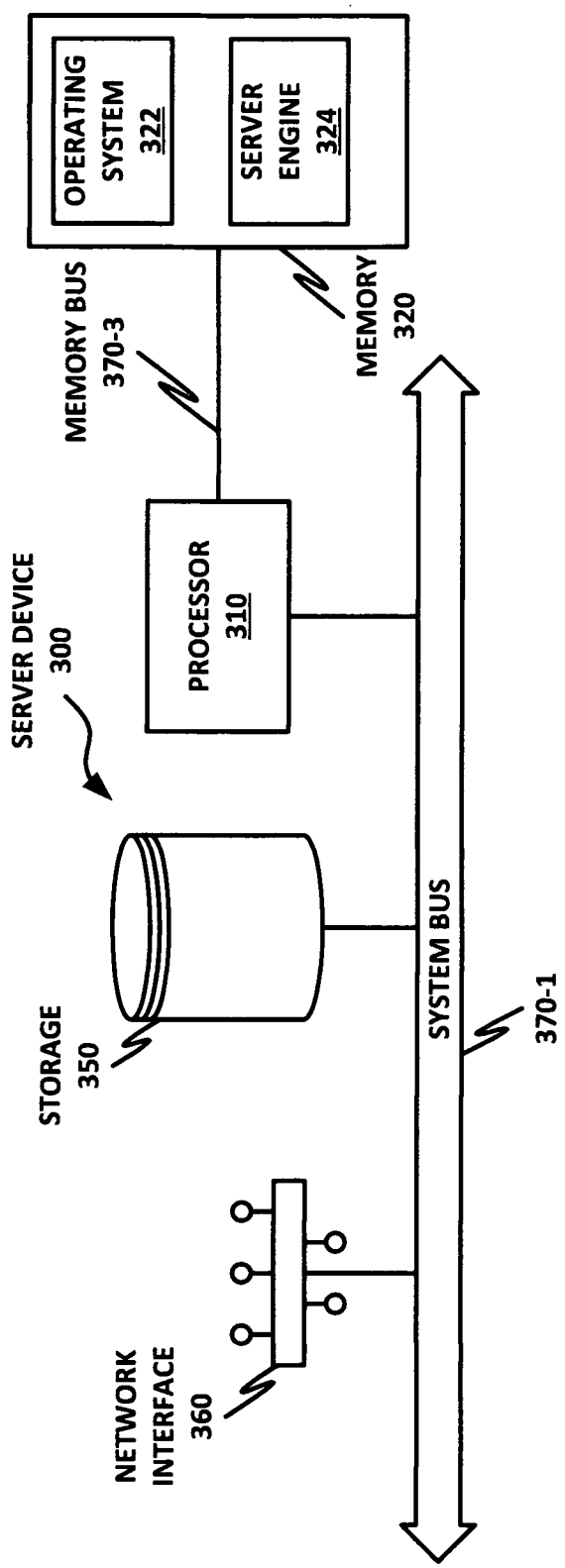
FIG. 3 is a block diagram of a server according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a server engine 324. Other components of server 300 include a storage 350, and network interface 360. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324.

Network interface 360 may be provided to communicatively couple server 140 to a wired or wireless network, and may include one or more logic elements as described in FIG. 2.

Server engine 324 is an engine as described in FIG. 2 and, in one example, includes one or more logic elements operable to carry out computer-implemented methods as described in this specification. Software portions of server engine 324 may run as a daemon process.

Server engine 324 may include one or more non-transitory computer-readable mediums having stored thereon executable instructions operable to instruct a processor to provide a security engine. At an appropriate time, such as upon booting server 140 or upon a command from operating system 322 or a user 120 or security administrator 150, processor 310 may retrieve a copy of server engine 324 (or software portions thereof) from storage 350 and load it into memory 320. Processor 310 may then iteratively execute the instructions of server engine 324 to provide the desired method.

Server engine 324 may provide any necessary facilities for enabling a client device 200 to communicate with server 300. As appropriate to the embodiment, server engine 324 may be or comprise an FTP server, HTTP server, HTTPS server, email server, secure shell server, or any other suitable server or engine for providing services to clients. In some examples, server engine 324 may include a hypervisor or other virtualization environment, as appropriate.

Figure 4:
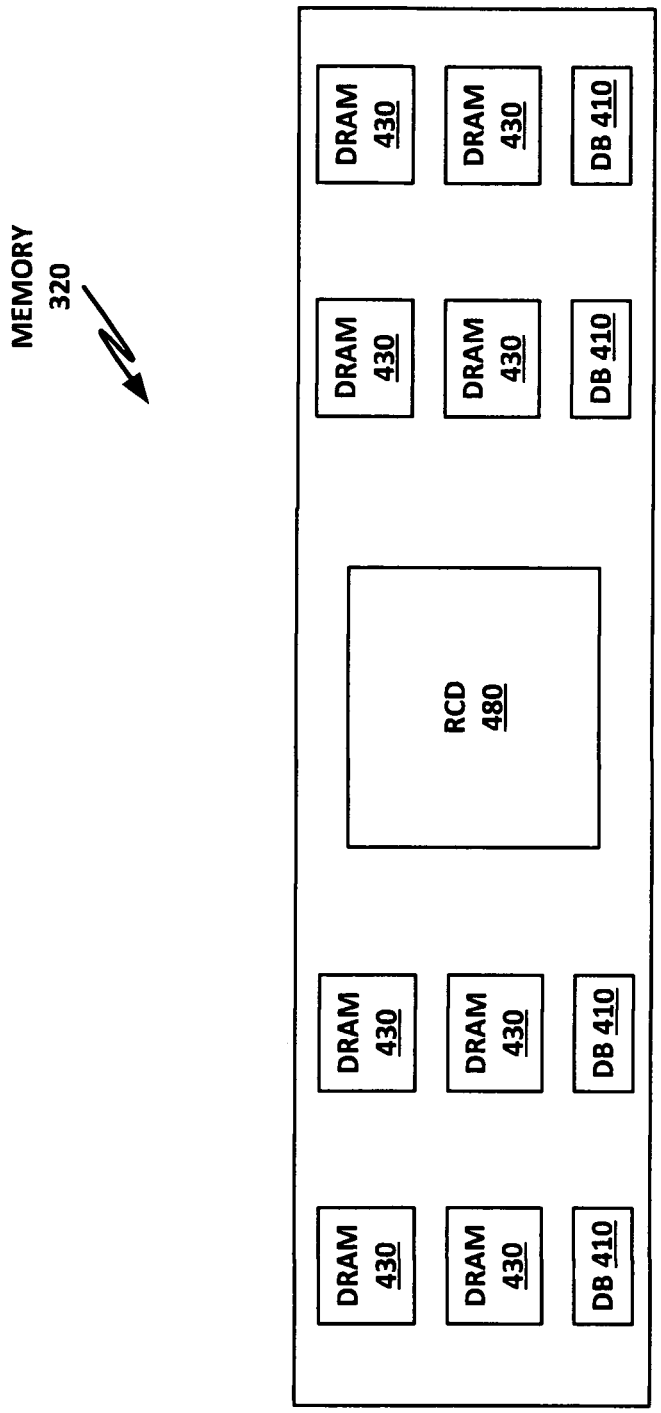
FIG. 4 is a block diagram of selected elements of a memory according to one or more examples of the present specification.

FIG. 4 is a block diagram of an embodiment of memory 320 according to one or more examples of the present specification. In the example of FIG. 4, memory 320 includes an RCD 480, a plurality of DRAM modules 430 divided into banks of two modules, and a data buffer 410 for each bank of DRAM modules 430.

DRAM modules 430 may be DIMMs or any other suitable memory technology, such as single inline memory modules (SIMMs), full-buffered DIMMs (FB-DIMMs), or any other circuit or integrated circuit for providing memory.

Registering clock driver (RCD) 480 may be an RCD or any other suitable memory driver. In this example, RCD 480 includes, by way of example, a register and a phase-lock loop (PLL). The register latches command and address input signals, for example on a rising clock edge. The PLL receives a differential clock signal and re-drives the clock signal to DB 410 and DRAM 430. Note however that a memory driver may be provided that does not provide the full functionality of RCD 480, or all or some of RCD 480 may be provided in a separate module or chip.

Data buffer 410 is a buffer for receiving incoming data from processor 310 and clocking data out to one or more DRAMs 430.

In this example, DRAMs 430 may be any suitable DRAM, including known DRAMs. Advantageously, DRAM 430 may not require modification to work with the fast memory initialization methods disclosed herein.

In an example write operation, on a memory cycle, such as on a rising clock edge, RCD 480 clocks out an address received from processor 310, while DB 410 clocks out a corresponding value. DRAM 430 then stores the data received from DB 410 into the address provided by RCD 480.

Figure 5:
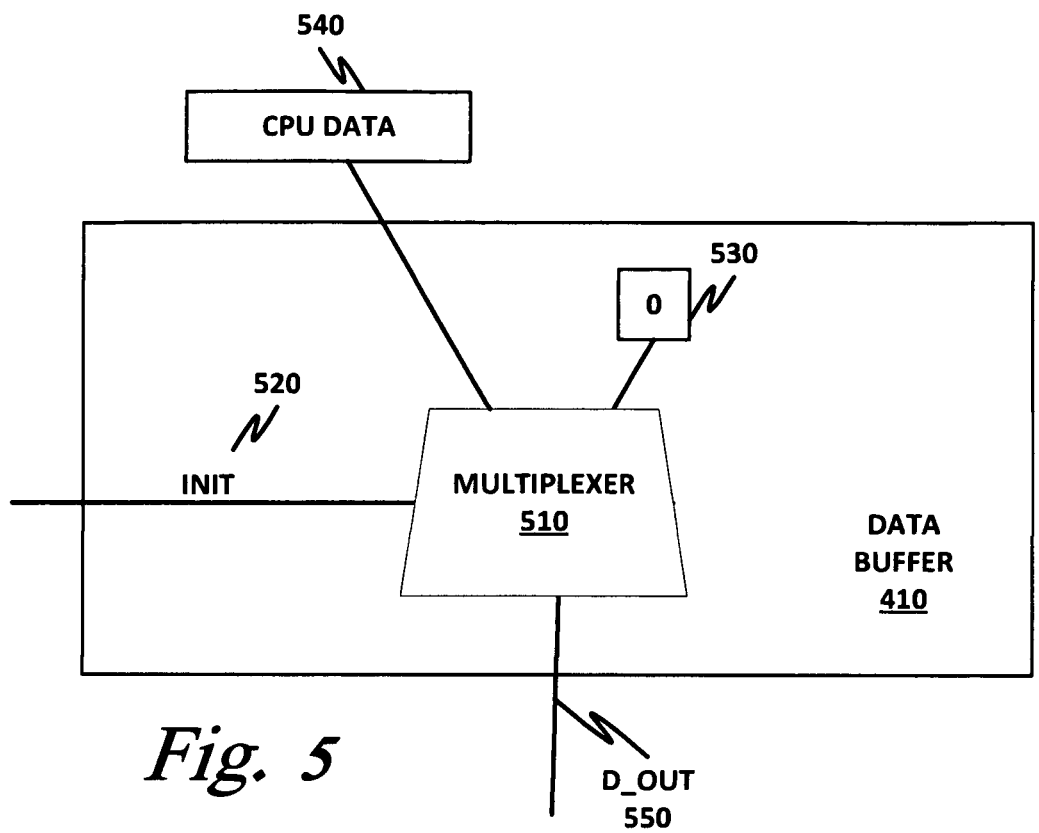
FIG. 5 is a block diagram of selected elements of a data buffer according to one or more examples of the present specification.

FIG. 5 is a block diagram of a data buffer 410 configured to provide the system and method of the present specification. For simplicity of description, only selected portions of data buffer 410 are disclosed in this view. Elements of data buffer 410 not disclosed in this view may be consistent with known configurations for data buffer 410.

In this example, data buffer 410 includes a multiplexer 510. Multiplexer 510 is disclosed as a two-to-one multiplexer, though it should be understood that the term "multiplexer" is intended to be construed broadly as any circuit, device, or network to select one or more outputs from a plurality of inputs, based on a selection signal or data. In this case, multiplexer 510 receives two inputs, namely CPU data 540, and a fixed "0" 530. Fixed "0" may be provided in an embodiment by tying the input to a chassis ground node, thus providing a logical "0." Any other suitable method of providing a logical 0 may be used. It should also be noted that a fixed 0 is provided by way of nonlimiting example. In other embodiments, input 530 could be a fixed 1 (provided, for example, by tying the input to a supply voltage to provide a logical "1"), a fixed pattern generator (such as "10101010"), or a random or pseudorandom number generator providing a stream of non-deterministic logical 0's and 1's, or any combination of the foregoing. The purpose of input 530 is to initialize memory 320, so that the values previously stored in memory 320 have been overwritten and are no longer available.

In this example, "INIT" signal 520 is provided as a selection input. When the "INIT" signal is "true," input 530 is selected. In an example, input 530 is provided for as long as "INIT" signal 520 is true. Data buffer 410 may thus have a simplified logic. It need not make decisions about how long to maintain input 530. Rather, it may act as a "dumb" terminal in the chain, simply providing either input 530, or CPU data 540, based on the current state of init signal 520.

Figure 6:
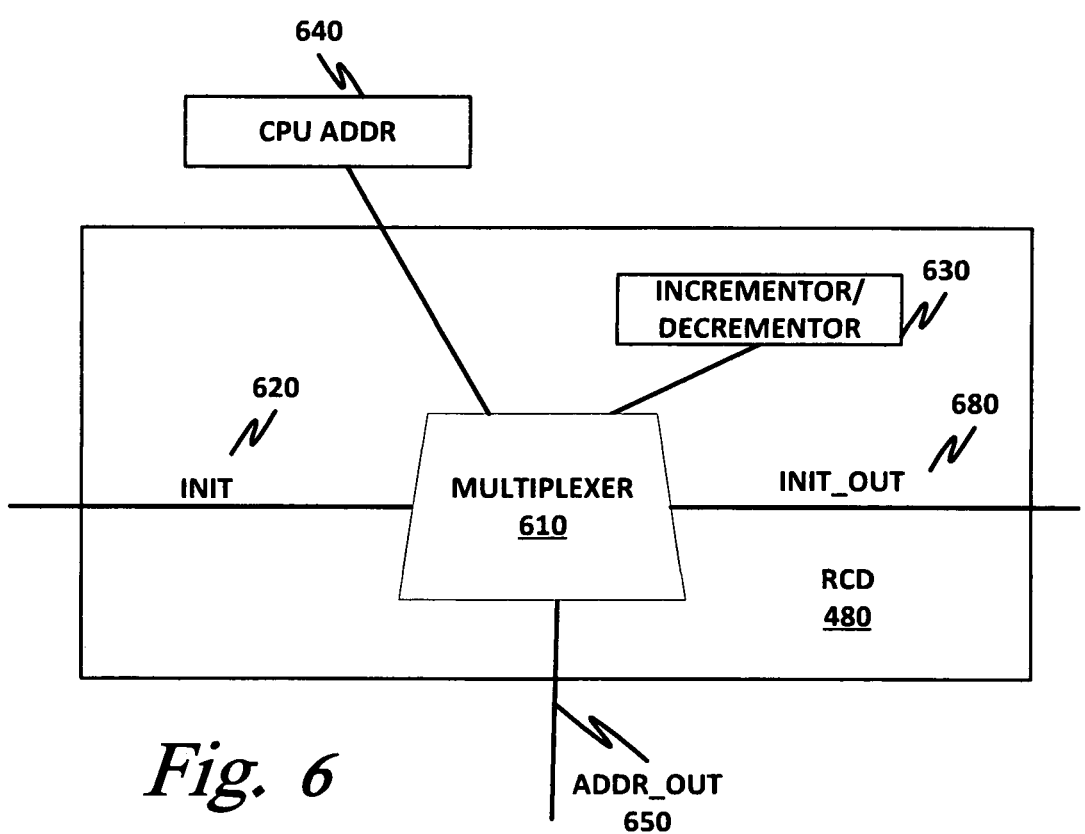
FIG. 6 is a block diagram of selected elements of a register clock driver (RCD) according to one or more examples of the present specification.

FIG. 6 is a block diagram of RCD 480 according to one or more examples of the present specification.

In this example, as with data buffer 410, only certain selected portions of RCD 480 are disclosed, for the purpose of simplifying the illustration. Certain portions of RCD 480 not shown herein may be consistent with existing configurations of an RCD.

In this example, RCD 480 includes a multiplexer 610. The same definitions and examples as multiplexer 510 of FIG. 5 may apply to multiplexer 610. In this case, the two inputs are CPU address 640 (provided by CPU 310 for normal addressing operations), and incrementor/decrementor 630 (I/D 630). ADDRESS_OUT 650 is the address provided to DRAM 430 of FIG. 4. The output of "INIT_OUT" 680 may be provided to data buffer 410 for use as "INIT" input 520.

Under normal operating conditions, when initialization is not being performed, CPU address 640 is used as the input, and is provided as "ADDRESS_OUT" 650. During those times, "INIT_OUT" is false.

Unlike data buffer 410, RCD 480 is not a dumb terminal in the transaction in certain embodiments. Rather, "INIT" 620 may be a message received from CPU 310 instructing RCD 480 to perform an initialization routine. RCD 480 then takes control of memory 320 and performs an initialization routine, such as the method of FIG. 7. During the initialization routine, multiplexer takes ADDR_OUT 650 from I/D 630 rather than from CPU address 640.

I/D 630 may be configured to step through the available addresses to initialize the full memory. In certain examples, where memory is divided into a plurality of parallel banks (as illustrated in FIG. 4), I/D 630 may provide a relative address that may be provided to all of the memory banks. Thus, in the example of FIG. 4, I/D 630 may be configured to initialize all four banks at the same time, thus massively parallelizing the memory initialization. I/D 630 steps through all available addresses, either incrementing from 0, or decrementing from the maximum memory address, as appropriate to the embodiment. While performing the initialization routine, INIT_OUT 680 is held at "true," so that data buffer 410 continues to provide input 530 at D_OUT 410.

When initialization is complete, RCD 480 returns INIT_OUT 680 to "false," and then provides CPU address 640 as ADDR_OUT 650. RCD 480 may also provide to CPU 310 a signal or message indicating success or failure. In one example, this is done by writing to a special-purpose register. In another example, a hardware signal may be used.

The logic for performing the initialization method (such as method 700 of FIG. 7) may be stored on any suitable computer-readable medium, including hardware instructions, software instructions stored on a non-volatile or read-only memory, or firmware. In some cases, RCD 480 may be provided with a special controller to perform the method.

In certain embodiments, memory 320 may be configured to use scrambled addresses and/or data. Scrambling may be used to prevent overloading data and address buses when a large number of similar or identical values are used for memory writing, as is the case in initialization (each subsequent address is mostly very close to the previous address, and the values may all be identical). In cases where scrambling is used, RCD 480 may need to be provided with a controller that is programmed to operate with the scrambling method, so that the correct addresses and data are written to memory. In that case, processor 310 may need to provide a hash key to RCD 380 to use in scrambling and unscrambling operations.

Figure 7:
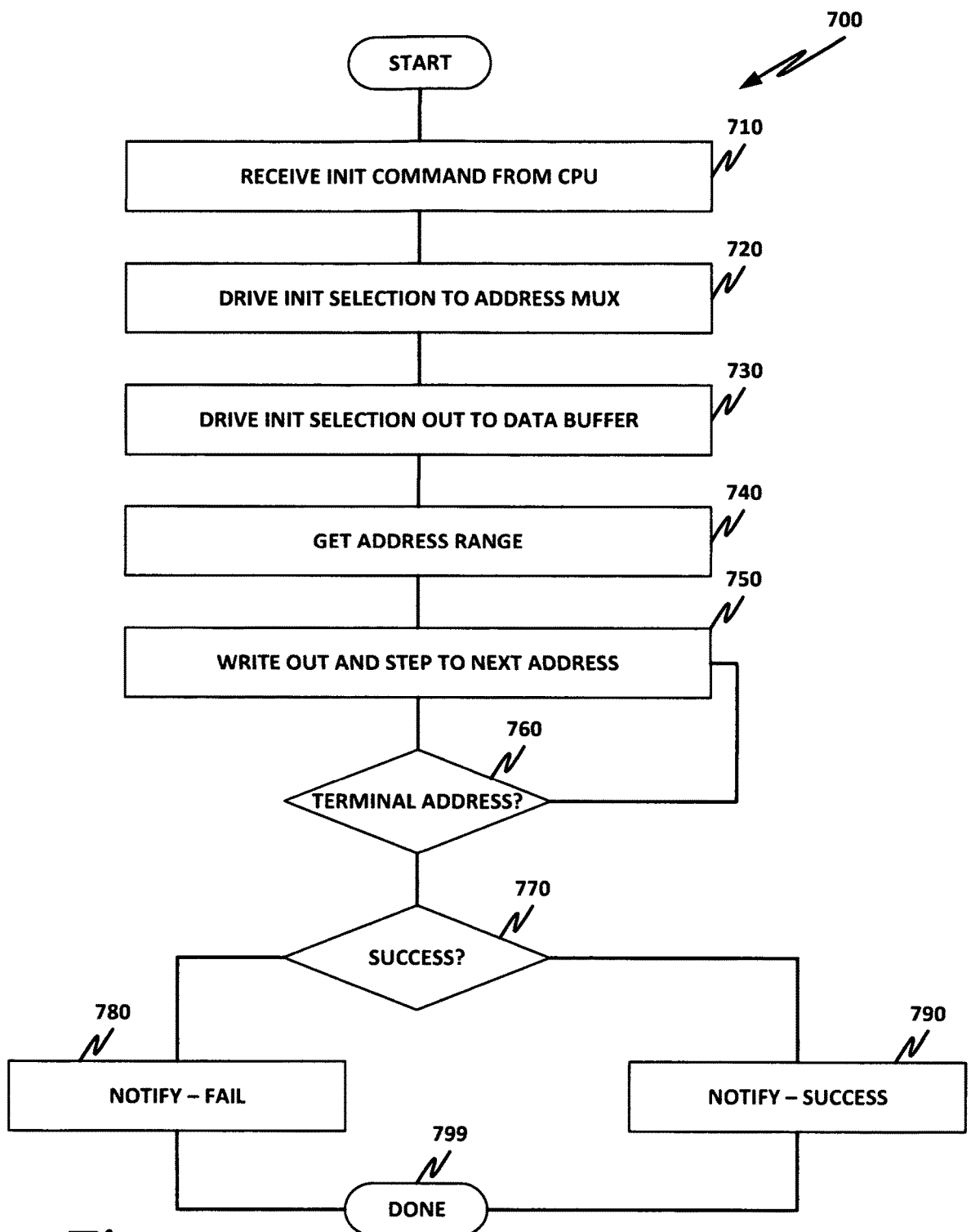
FIG. 7 is a flow chart of a method according to one or more examples of the present specification.

FIG. 7 is a flow chart of a method 700 performed by RCD 480 according to one or more examples of the present specification.

In block 710, RCD 480 receives an INIT command from CPU 430./ The INIT command may take any suitable form, such as a signal or message, or writing to a special register or memory location.

In block 720, RCD 480 drives "INIT" selection 620 onto MUX 650. This could be a physical signal on a physical mux, or it could be passing a message or writing to a special register or memory location.

In block 730, RCD 480 drives INIT_OUT 680, which propagates to data buffer 410, driving INIT 520. As before, this could be a physical signal, or any other suitable method of notifying means, such as a signal, register, or special memory location.

In block 740, RCD 480 receives the address range of the memory to be initialized. This may be a pre-configured value, it could be an explicit signal from processor 310, or it could be determined by RCD 480 by polling the memory.

In block 750, RCD 480 writes out the value (such as value 530), and then steps to the next address via I/D 630.

In decision block 760, RCD 480 determines whether the current address is the terminal (i.e., last) address for memory initialization. If not, then control passes back to block 750 so that the next address is written.

If the terminal address has been reached, then in decision block 770, RCD 480 determines whether the initialization was successful (i.e., completed without any errors). If it was successful, then in block 780, RCD 480 uses appropriate means to notify processor 310 of the success. This may include a signal, a message, or writing to a special register or memory location, or any other suitable notification means.

If the initialization was unsuccessful (i.e., errors were encountered), then in block 790, RCD 480 uses appropriate notification means to notify processor 310 that initialization failed. In one example, notifying processor 310 of failure comprises changing the polarity of a data bus rather than providing an explicit, separate signal. In that case, processor 310 may take appropriate action, which in some cases may include attempting a processor-memory-controller-drive initialization.

In block 799, the method is done.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 310, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 350 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 320 and storage 350, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 310 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for"

or "steps for" are specifically used in the particular claims; and (b) does not intend, by any statement in the specification, to limit this disclosure in any way that is not otherwise expressly reflected in the appended claims.

EXAMPLE IMPLEMENTATIONS

There is disclosed in example 1, a computing apparatus, comprising: a processor; and a memory module, comprising a memory driver to: receive a memory initialization command from the processor; incrementally step through a plurality of initialization addresses of the memory, writing a determinate value to each initialization address.

There is disclosed in example 2, the computing apparatus of example 1, wherein the memory driver further comprises notification means to notify the processor of a status of the initialization command.

There is disclosed in example 3, the computing apparatus of example 2, wherein notifying the processor comprises notifying the processor of success.

There is disclosed in example 4, the computing apparatus of example 2, wherein notifying the processor comprises notifying the processor of failure.

There is disclosed in example 5, the computing apparatus of example 4, wherein notifying the processor of failure comprises changing the polarity of the data bus.

There is disclosed in example 6, the computing apparatus of example 4, wherein notifying the processor of failure comprises writing to a register.

There is disclosed in example 8, the computing apparatus of any of examples 1-5, wherein the determinate value is zero.

There is disclosed in example 9, the computing apparatus of example 7, wherein writing a zero comprises pulling a data input to ground.

There is disclosed in example 10, the computing apparatus of any of examples 1-5, wherein the determinate value is 1.

There is disclosed in example 11, the computing apparatus of example 9, wherein writing a one comprises pulling a data input up to a supply voltage.

There is disclosed in example 12, the computing apparatus of any of examples 1-5, wherein the processor is further to receive a hash key from the processor.

There is disclosed in example 13, the computing apparatus of any of examples 1-5, wherein the memory driver is further to multiplex a processor data input with the determinate value.

There is disclosed in example 14, the computing apparatus of any of examples 1-5, wherein the memory driver is further to multiplex a processor-supplied address with an initialization address.

There is disclosed in example 15, a memory driver, comprising: a data buffer to drive a determinate value to a data bus to communicatively couple to a memory; and a register clock driver to: receive a memory initialization command from a processor; and incrementally step through a plurality of initialization addresses, sequentially driving each initialization address to an address bus to communicatively couple to the memory.

There is disclosed in example 16, the memory driver of example 14, wherein the memory driver further comprises notification means to notify the processor of a status of the initialization command.

There is disclosed in example 17, the memory driver of example 15, wherein notifying the processor comprises notifying the processor of success.

There is disclosed in example 18, the memory driver of example 15, wherein notifying the processor comprises notifying the processor of failure.

There is disclosed in example 19, the memory driver of example 15, wherein notifying the processor of failure comprises writing to a register.

There is disclosed in example 20, the memory driver of any of examples 14-18, wherein the register clock driver further comprises an initialization output to communicatively couple to an initialization input of the data bus, and wherein the data bus is to drive the determinate value to the data bus only as long as the initialization input is driven.

There is disclosed in example 21, the memory driver of any of examples 14-18, wherein the determinate value is zero.

There is disclosed in example 22, the memory driver of any of examples 14-18, wherein the data buffer further comprises a multiplexer to select between a processor-supplied data value and the determinate value.

There is disclosed in example 23, the memory driver of any of examples 14-18, wherein the register clock driver further comprises a multiplexer to select between a processor-supplied address and the plurality of initialization addresses.

There is disclosed in example 24, a computer-implemented method of initializing a memory, comprising: receiving an initialization command from a processor; independently of the processor incrementally stepping through a plurality of initialization addresses of the memory, writing a determinate value to each initialization address.

There is disclosed in example 25, the computer-implemented method of example 23, wherein the determinate value is zero.

There is disclosed in example 26, the computer-implemented method of example 23, further comprising notifying the processor of success or failure.

There is disclosed in example 26, a method of providing fast initialization of a memory, comprising: receiving a memory initialization command from a processor; and independently of the processor, incrementally stepping through a plurality of initialization addresses of the memory, writing a determinate value to each initialization address.

There is disclosed in example 27, the method of example 26, further comprising notifying the processor of a status of the initialization command.

There is disclosed in example 28, the method of example 27, wherein notifying the processor comprises notifying the processor of success.

There is disclosed in example 29, the method of example 27, wherein notifying the processor comprises notifying the processor of failure.

There is disclosed in example 30, the method of example 29, wherein notifying the processor of failure comprises writing to a register.

There is disclosed in example 31, the method of any or examples 27-30, wherein the determinate value is zero.

There is disclosed in example 32, the method of example 31, wherein writing a zero comprises pulling a data input to ground.

There is disclosed in example 33, the method of any of examples 27-30, further comprising receiving a hash key from the processor.

There is disclosed in example 34, the method of any of examples 27-30, further comprising multiplexing a processor data input with the determinate value.

There is disclosed in example 35, the method of any of examples 27-30, further comprising multiplexing a processor-supplied address with an initialization address.

There is disclosed in example 36, an apparatus comprising means for performing the method of any of examples 26-35.

There is disclosed in example 37, the apparatus of example 36, wherein the means for performing the method comprise a processor and a memory.

There is disclosed in example 38, the apparatus of Example 37, wherein the memory comprises machine-readable instructions, that when executed cause the apparatus to perform the method of any of examples 26-35.

There is disclosed in example 39, the apparatus of any of Examples 36-38, wherein the apparatus is a computing system.

There is disclosed in example 40, at least one computer readable medium comprising instructions that, when executed, implement a method or realize an apparatus as described in any preceding example.

There is disclosed in example 41, a computing apparatus, comprising: a processor; a memory module, comprising a memory driver to: receive a memory initialization command from the processor; and incrementally step through a plurality of initialization addresses of the memory, writing a value to each initialization address.

There is disclosed in example 42, the computing apparatus of example 41, wherein the memory driver is to receive the memory initialization command from the processor at boot time.

There is disclosed in example 43, the computing apparatus of example 41, wherein the processor comprises a memory controller, and wherein the memory driver is to operate independently of the memory controller.

There is disclosed in example 44, the computing apparatus of example 41, wherein the memory module comprises a plurality of memory elements in two or more banks, and wherein the memory driver is to incrementally step through the plurality of initialization addresses of the two or more banks in parallel.

There is disclosed in example 45, the computing apparatus of example 41, wherein the memory module further comprises a data buffer to provide the value.

What is claimed is:

1. An apparatus, comprising:
   a first memory bank comprising a first memory module;
   a first data buffer coupled to the first memory bank;
   a second memory bank comprising a second memory module;
   a second data buffer coupled to the second memory bank; and
   a memory driver comprising circuitry, the memory driver communicatively coupled to the first memory module and the second memory module, the memory driver to:
   receive a memory initialization command from a processor;
   responsive to the memory initialization command, scramble a plurality of addresses of the first memory module and the second memory module and incrementally step through the plurality of scrambled addresses, writing one or more determinate values to the plurality of scrambled addresses, wherein writing one or more determinate values to the plurality of scrambled addresses comprises simultaneously writing contents of the first data buffer to the first memory module of the first memory bank and writing contents of the second data buffer to the second memory module of the second memory bank; and
   receive a hash key from the processor and use the hash key to generate the plurality of scrambled addresses responsive to the memory initialization command.

2. The apparatus of claim 1, further comprising the processor, and wherein the memory driver is further to notify the processor of a status of the memory initialization command.

3. The apparatus of claim 2, wherein notifying the processor comprises notifying the processor of success.

4. The apparatus of claim 2, wherein notifying the processor comprises notifying the processor of failure.

5. The apparatus of claim 4, wherein notifying the processor of failure comprises changing the polarity of a data bus.

6. The apparatus of claim 4, wherein notifying the processor of failure comprises writing to a register.

7. The apparatus of claim 1, wherein the one or more determinate values are all zeros.

8. The apparatus of claim 7, wherein writing a zero comprises pulling a data input to ground.

9. The apparatus of claim 1, wherein the memory driver is further to multiplex a processor data input with a determinate value of the one or more determinate values.

10. The apparatus of claim 1, wherein the memory driver is further to multiplex a processor-supplied address with an address of the plurality of scrambled addresses.

11. A memory driver, comprising:
    a first data buffer to couple to a first memory module of a first memory bank;
    a second data buffer to couple to a second memory module of a second memory bank; and
    a register clock driver to:
    receive a memory initialization command from a processor;
    responsive to the memory initialization command, scramble a plurality of addresses of the first memory module and the second memory module and incrementally step through the plurality of scrambled addresses, writing one or more determinate values to the plurality of scrambled addresses, wherein writing one or more determinate values to the plurality of scrambled addresses comprises simultaneously writing contents of the first data buffer to the first memory module of the first memory bank and writing contents of the second data buffer to the second memory module of the second memory bank; and
    receive a hash key from the processor and use the hash key to generate the plurality of scrambled addresses responsive to the memory initialization command.

12. The memory driver of claim 11, wherein the memory driver is further to notify the processor of a status of the memory initialization command.

13. The memory driver of claim 12, wherein notifying the processor comprises notifying the processor of success.

14. The memory driver of claim 12, wherein notifying the processor comprises notifying the processor of failure.

15. The memory driver of claim 12, wherein notifying the processor of failure comprises writing to a register.

16. The memory driver of claim 11, wherein the register clock driver further comprises an initialization output to communicatively couple to an initialization input of a data bus, and wherein the data bus is to drive the one or more determinate values to the data bus only as long as the initialization input is driven.

17. The memory driver of claim 11, wherein the one or more determinate values are all zeros.

18. The memory driver of claim 11, wherein the first data buffer further comprises a multiplexer to select between a processor-supplied data value and the one or more determinate values.

19. The memory driver of claim 11, wherein the register clock driver further comprises a multiplexer to select between a processor-supplied address and the plurality of scrambled addresses.

20. A computer-implemented method of initializing a plurality of memory modules, comprising:

receiving a memory initialization command from a processor;

responsive to the memory initialization command, scrambling a plurality of addresses of a first memory module of a first memory bank and a second memory module of a second memory bank, incrementally stepping through the plurality of scrambled addresses, and writing one or more determinate values to the plurality of scrambled addresses, wherein writing one or more determinate values to the plurality of scrambled addresses comprises simultaneously writing contents of a first data buffer to the first memory module of the first memory bank and writing contents of a second data buffer to the second memory module of the second memory bank; and receiving a hash key from the processor and using the hash key to generate the plurality of scrambled addresses responsive to the memory initialization command.

21. The computer-implemented method of claim 20, further comprising notifying the processor of success or failure.

22. The apparatus of claim 1, the memory driver to provide an address of the plurality of scrambled addresses to the first memory bank and the second memory bank during a parallel initialization of the first memory bank and the second memory bank performed responsive to the memory initialization command.

23. The apparatus of claim 1, the memory driver further to latch a determinate value to the first data buffer coupled to the first memory bank and to the second data buffer coupled to the second memory bank responsive to the memory initialization command, the latched determinate value to be simultaneously written to the first memory module of the first memory bank and the second memory module of the second memory bank.

24. The apparatus of claim 1, the memory driver further to receive an address range from the processor or to poll memory to determine the address range and responsive to the memory initialization command incrementally step through the address range to initialize the memory.

* * * * *